Dec. 14, 1965   D. MARCAN   3,222,819
CONTAINERS FOR PLANTS
Filed Oct. 22, 1963   4 Sheets-Sheet 1
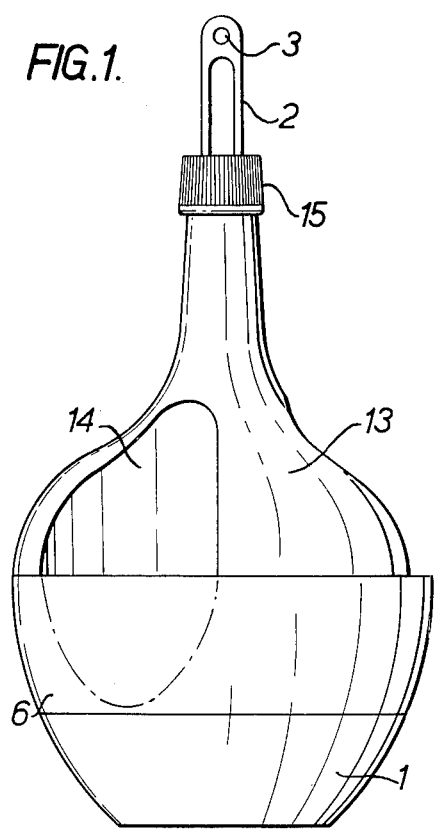
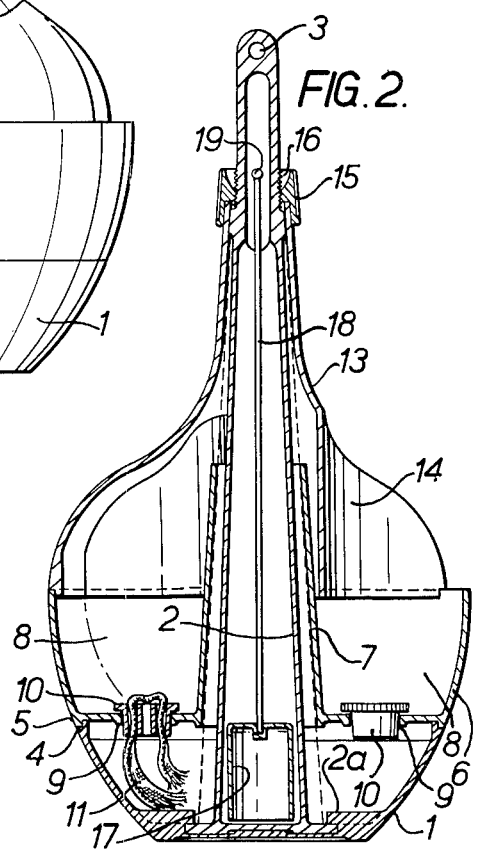
Inventor:
DAVID MARCAN
By 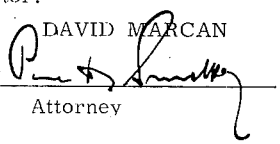
Attorney Dec. 14, 1965     D. MARCAN     3,222,819
CONTAINERS FOR PLANTS
Filed Oct. 22, 1963     4 Sheets-Sheet 2
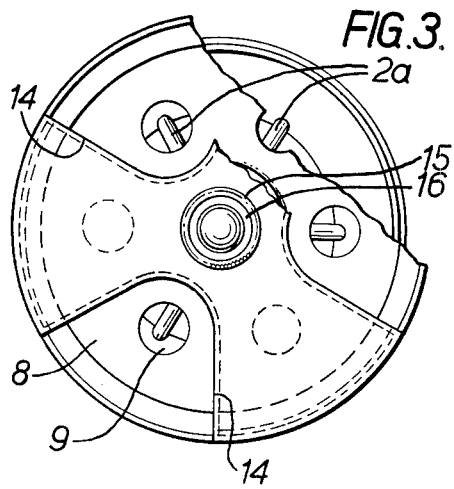
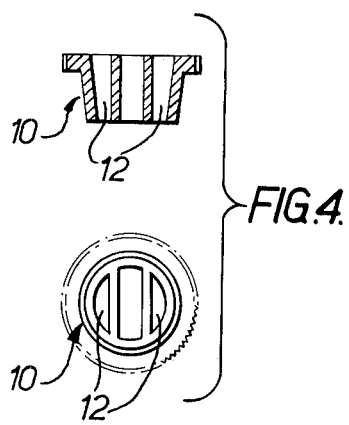
Inventor:
DAVID MARCAN

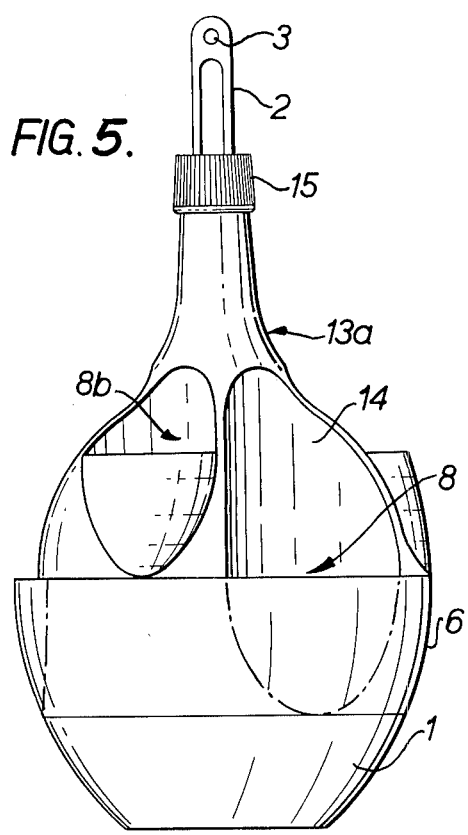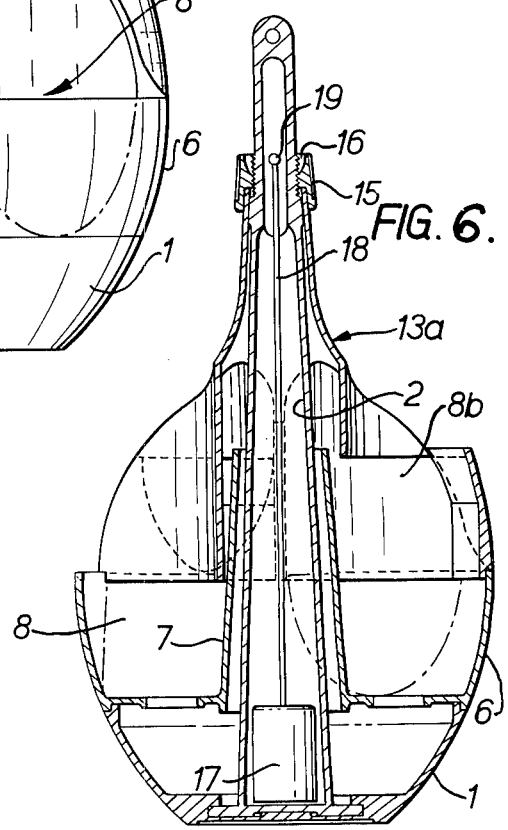

Dec. 14, 1965   D. MARCAN   3,222,819
CONTAINERS FOR PLANTS
Filed Oct. 22, 1963   4 Sheets-Sheet 4
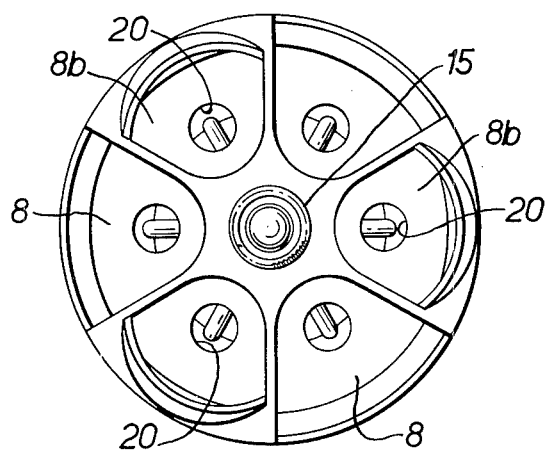
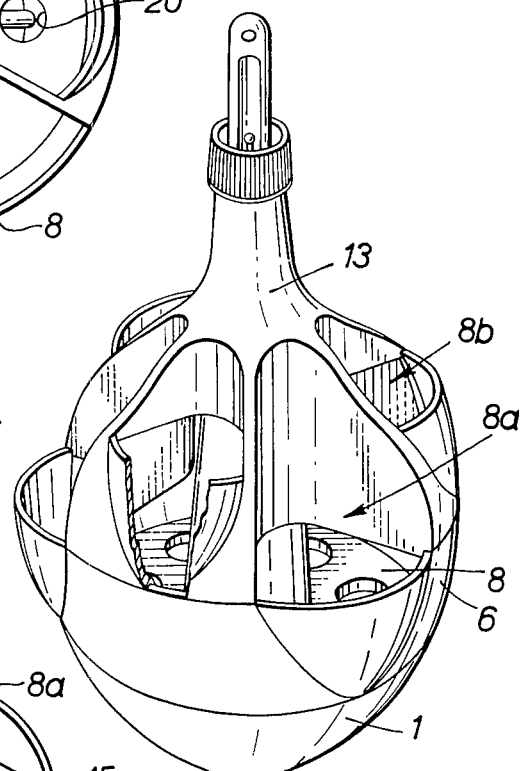
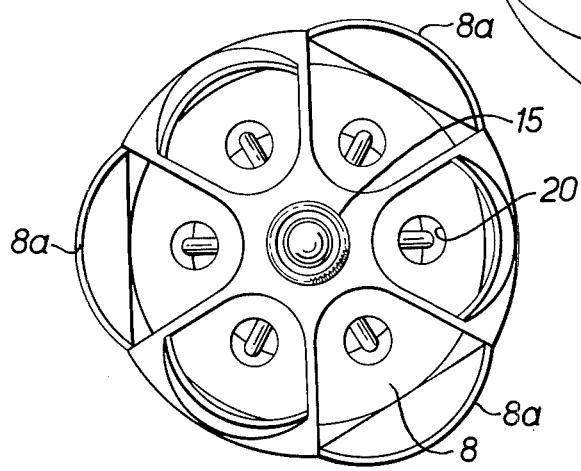
Inventor:
DAVID MARCAN
By: [signature]
Attorney

United States Patent Office 3,222,819
Patented Dec. 14, 1965

3,222,819
CONTAINERS FOR PLANTS
David Marcan, Burrough's Grove, Pump Lane,
Little Marlow, England
Filed Oct. 22, 1963, Ser. No. 317,969
Claims priority, application Great Britain, Apr. 30, 1963,
7,213/63; July 15, 1963, 27,993/63
6 Claims. (Cl. 47—38.1)

This invention relates to containers for plants, more particularly containers intended to be suspended from above.

With so-called hanging baskets and like containers for plants as used today, the watering of plants growing therein invariably presents something of a problem. Almost always too much water is applied and the surplus drips from a container on to the floor beneath. For this reason alone it is not convenient to have such a container indoors; it is usually hung up in a porch, conservatory or the like where the water can drip without causing any harm on to a stone, or the like, floor from which it will quickly evaporate. Of course, if insufficient water is applied then plants tend to wither and die, and become very unsightly.

The present invention has for its main object to provide a container for plants which can be suspended from above and which will not suffer from disadvantages as indicated above.

According to this invention there is provided a container for plants without any drainage hole and adapted to be suspended from above, said container being divided into at least one upper part for containing soil and a lower part for containing liquid which may be fed to the soil in the upper part by means of a wick extending between the two parts, means being provided whereby liquid in the lower part may be replenished as required.

In the accompanying drawings:

FIG. 1 shows in side elevation a container in accordance with one embodiment of this invention, a modification being indicated in broken lines, FIG. 2 is a vertical section through this container, and FIG. 3 is a plan view thereof, with parts broken away;

FIG. 4 shows in section and plan, and on an enlarged scale, a wick carrying plug as incorporated in the container shown in FIGS. 1 to 3;

FIG. 5 shows in side elevation a container in accordance with another embodiment of this invention, a modification thereof being indicated in broken lines, FIG. 6 is a vertical section through this container, FIG. 7 is a plan view thereof, FIG. 8 is a plan view of the container including the modification as indicated in FIG. 5, and FIG. 9 shows a container as in FIG. 5 but with a modification.

The container shown in FIGS. 1 to 3 includes a lower dish-shaped part 1 for containing liquid, this part being connected centrally to an upstanding pillar 2, in the upper end of which is provided a suspension eye 3.

The pillar 2 may be formed as a hollow tapering tube or it may comprise a plurality of equally spaced webs. The connection between the liquid container 1 and the pillar 2 may take any convenient form, such as the lugs 2a, or alternatively the two may be formed integrally.

The side wall of the liquid container 1 is outwardly inclined from the bottom thereof and at its upper edge it is formed with a horizontal recess 4 adapted to receive a flange 5 on the bottom of an upper part 6 for containing soil, the side wall of this part forming an upward curved extension of the side wall of the lower liquid containing part 1.

Centrally the upper part 6 is formed with a tapering tubular element 7 which extends above the outer upper edge thereof and surrounds the pillar 2 in spaced relationship therewith. Three portions which comprise a chamber 8 for containing soil are arranged in equally spaced relationship around the tubular element 7. In the bottom of each portion of chamber 8 there is provided an aperture 9 for the reception of a plug 10 carrying a wick 11. The plug 10 (see FIG. 4) may be of mushroom shape with two segmental shaped bores 12 extending through it. The wick is formed of any suitable material which is capable of taking up liquid by capillary action and is simply passed up one of the bores 12 and down through the other. In use the free ends of the wick hang down into liquid in the lower part 1; once wet the wick will be firmly held in the plug 10. Alternatively, the plug 10 may be omitted and the wick be simply passed through slots or apertures formed in the bottom of the upper part 6.

Adapted to fit on top of the soil containing upper part 6 is a neck member 13, which is formed so that in combination with the upper and lower parts 1 and 6 it forms a unit of overall bottle shape. The neck member 13, is, however, formed with recesses 14 therein which register with the portions of chamber 8. Thus, after assembly, three equally spaced pockets are provided in which plants may be grown.

The neck member 13 has a cap 15 which is screw threaded internally so that it can be engaged with a corresponding screw thread on the pillar 2, whereby the parts 1 and 6 and the member 13 will be firmly held together on the pillar.

A cavity 16 is formed in the top of the cap 15 and this communicates with the interior of the pillar 2. Thus, to fill the lower part 1 with liquid the latter is poured into the cavity 16 from which it flows down inside the pillar 2. Inside the pillar is a float 17 carrying an indicator rod 18 with a knob 19 at its upper end. The knob 19 is always visible in the top of the pillar 2 above the cap 15, the position of the knob indicating the liquid level in the lower part 1.

The portions of chamber 8 may be enlarged by the provision of outwardly directed lips 8a as indicated in broken lines.

In the container shown in FIGS. 5 to 7 the neck member 13a is somewhat enlarged and is provided with a further chamber 8b comprising three portions which are staggered in relation to the recesses 14 in the neck member and thus also in relation to the portions of chamber 8 in the upper part 6, this latter part having formed therein passages 20 for wicks extending from the portions of chamber 8b to the liquid container 1. The neck member in effect forms a second upper part for containing soil.

As indicated by broken lines in FIGS. 5 and 6 the portions of chamber 8 may again be enlarged by the provision of outwardly directed lips 8a. FIG. 8 is a plan view of a container in which such lips are provided.

In the use of a container as above described the chambers 8, 8b are filled with soil and this is either seeded or planted with seedlings or plants as desired. The liquid container 1 is filled with liquid, by which is meant either water or any appropriate solution containing fertilising substances. The container is then hung up. It is thereafter merely necessary to keep the liquid container filled.

Instead of an upper part 6 formed with a plurality of portions in separate chambers, an upper part having a single large annular chamber 8x could be provided (see FIGURE 9). Moreover, in this case the portions of chamber 8b in the neck member 13 would be open at their lower ends so that soil in these portions and said annular chamber would be continuous, the provision of separate wicks to the portions of the chambers in the neck member therefore becoming unnecessary.

I claim:
1. A plant container without any drainage hole comprising a pillar member, a lower section carried by said pillar member for containing liquids, an intermediate section mounted on said lower section for containing soil, wick means extending between said intermediate and lower sections for feeding liquid from said lower section to said soil in said intermediate section, an upper section mounted on said intermediate section, said upper section having a given plurality of spaced recesses therein, said recesses in combination with said intermediate section defining said given plurality of separate chambers for respectively containing plants therein, said pillar member extending upwardly from said lower section through said intermediate and upper sections, means communicating with said pillar member for permitting the introducing of said liquid into said lower section through said pillar, and water level indicating means extending upwardly within the confines of said pillar member from said lower section.

2. A plant container without any drainage hole comprising a lower section for containing liquid, a pillar member extending upwardly from said lower section and joined thereto for carrying said lower section, an intermediate section mounted on said lower section for containing soil, wick means extending between said intermediate and lower sections for feeding liquid from said lower section to said soil in said intermediate section, an upper section mounted on said intermediate section, said upper section having a given plurality of spaced recesses therein, said recesses in combination with said intermediate section defining said given plurality of separate chambers for respectively containing plants therein, said pillar member extending upwardly from said lower section through said intermediate section and through and beyond said upper section, float means in said lower section, an indicating rod affixed to said float means extending upwardly within the confines of said pillar member from said float means for indicating the level of liquid in said lower section, and means communicating with said pillar member for permitting the introducing of said liquid into said lower section through said pillar member.

3. A plant container as defined in claim 2 wherein said upper section terminates at its upper end portion in a neck, and wherein said liquid introducing permitting means comprises a cap threadedly engaging said pillar member at said neck for enabling the firm joining of said three sections, said cap having a depression therein communicating with the interior of said pillar member for permitting said introduction of said liquid.

4. A plant container without any drainage hole comprising a lower section for containing liquid, a pillar member extending upwardly from said lower section and joined thereto for carrying said lower section, an intermediate section mounted on said lower section for containing soil, an upper section mounted on said intermediate section, said upper section having a given plurality of spaced walled recesses therein, said recesses in combination with said intermediate section defining said given plurality of first spaced chambers for containing plants therein, the respective adjacent walls of said recesses defining said given plurality of second chambers respectively intermediate said first chambers for containing soil for the receiving of plants therein, wick means extending between said lower section and said intermediate and upper sections for feeding liquid to the soil in said intermediate and upper sections, said pillar member extending upwardly through said lower, intermediate and upper sections, means communicating with said pillar member for permitting the introducing of said liquid into said lower section through said pillar member, and indicating means extending upwardly within the confines of said pillar member from said lower section.

5. A plant container without any drainage hole comprising a lower section containing liquid, a pillar member extending upwardly from said lower section for carrying said lower section, an intermediate section mounted on said lower section for containing soil, an upper section mounted on said intermediate section, said upper section having a given plurality of spaced walled recesses therein, said recesses in combination with said intermediate section defining said given plurality of first spaced chambers for containing plants therein, the respective adjacent walls of said recesses defining said given plurality of second chambers respectively intermediate said first chambers for containing soil for the receiving of plants therein, wick means extending between said lower section and said intermediate and upper sections for feeding liquid to the soil in said intermediate and upper sections, said pillar member extending upwardly from said lower section through said intermediate section and through and beyond said upper section, float means in said lower section, an indicating rod affixed to said float means extending upwardly within the confines of said pillar member from said float means for indicating the level of liquid in said lower section, and means communicating with said pillar member for permitting the introducing of said liquid into said lower section through said pillar.

6. A plant container as defined in claim 5 wherein said upper section terminates at its upper end portion in a neck, and wherein said liquid introducing permitting means comprises a cap threadedly engaging said pillar member at said neck for enabling the firm joining of said sections, said cap having a depression therein which communicates with the interior of said pillar member for permitting the introduction of said liquid.

References Cited by the Examiner

UNITED STATES PATENTS

| | | | |
|---|---|---|---|
| 52,200 | 1/1866 | Prince | 47—35 |
| 96,144 | 10/1869 | Putnam | 47—34.6 |
| 180,242 | 7/1876 | Kniest. | |
| 253,716 | 2/1882 | Johnston | 47—38.5 |
| 354,416 | 12/1886 | Heisey | 47—35 |
| 440,141 | 11/1890 | Dearborn | 47—34.6 |
| 1,063,395 | 6/1913 | Scribner | 47—35 |
| 1,108,334 | 8/1914 | Carr | 47—38.1 |
| 1,533,342 | 4/1925 | Schein | 47—38.4 |
| 2,030,268 | 2/1936 | Radley | 47—38.3 |
| 2,249,197 | 7/1941 | Brundin | 47—38.5 |
| 2,556,522 | 6/1951 | Cienfuegos | 47—38.5 |
| 2,803,923 | 8/1957 | Pratt | 47—34.6 |

FOREIGN PATENTS

| | | |
|---|---|---|
| 1,240,935 | 8/1960 | France. |
| 1,301,913 | 7/1961 | France. |
| 717,320 | 1/1942 | Germany. |
| 403,460 | 12/1933 | Great Britain. |
| 863,177 | 10/1958 | Great Britain. |
| 231,444 | 3/1944 | Switzerland. |

ABRAHAM G. STONE, *Primary Examiner.*

T. GRAHAM CRAVER, ANTONIO F. GUIDA,
*Examiners.*